Feb. 23, 1965 A. H. BOESE Re. 25,734
TIME DELAY ACTION AND RELEASE FOR AIRBORNE TOYS
Original Filed April 15, 1959
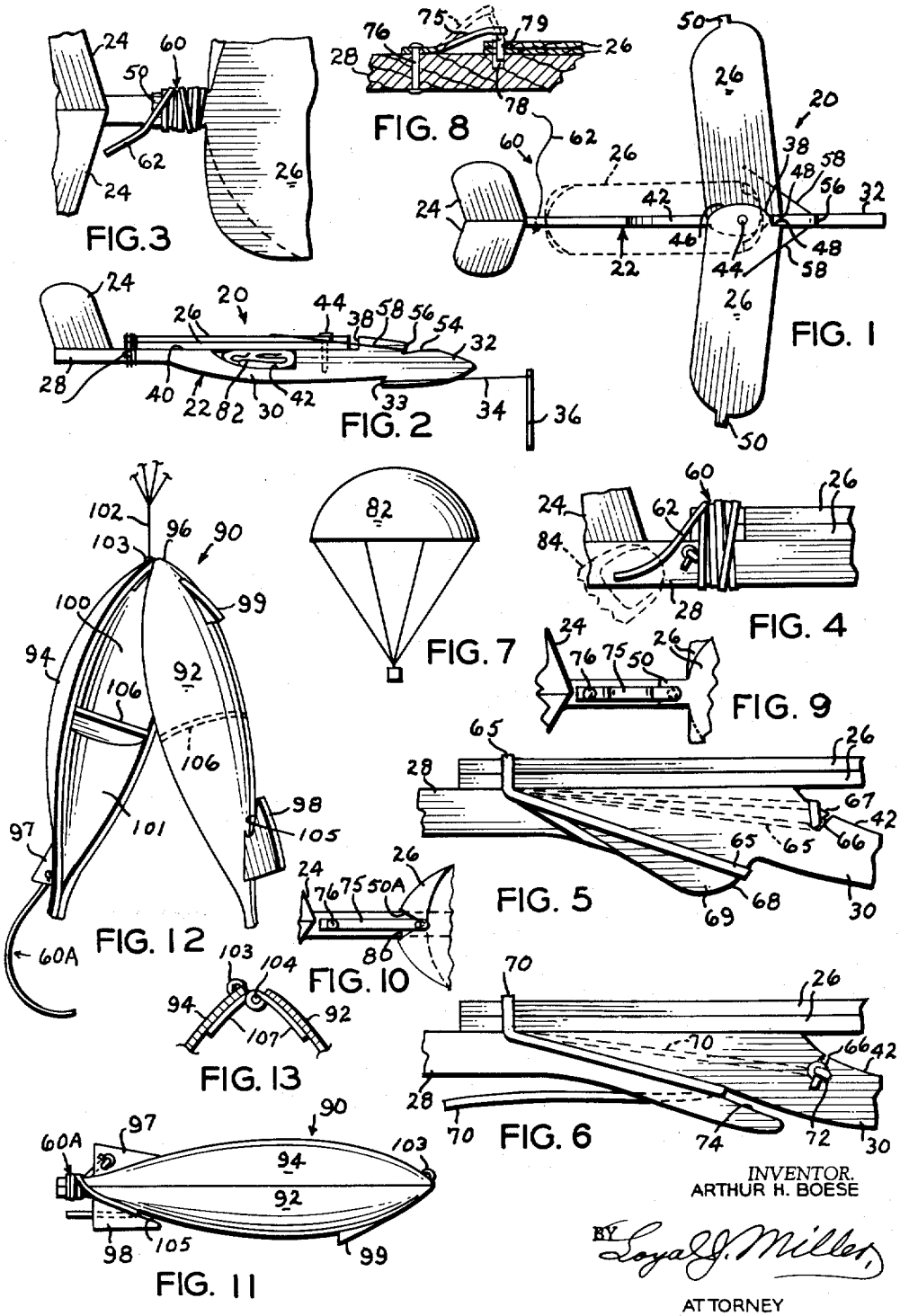
INVENTOR.
ARTHUR H. BOESE
BY Loyal J. Miller
ATTORNEY United States Patent Office Re. 25,734
Reissued Feb. 23, 1965

25,734

TIME DELAY ACTION AND RELEASE FOR AIRBORNE TOYS

Arthur H. Boese, Oklahoma City, Okla., assignor of one-half to Novel Ideas Incorporated, Oklahoma City, Okla., a corporation of Oklahoma Original No. 3,006,109, dated Oct. 31, 1961, Ser. No. 806,496, Apr. 15, 1959. Application for reissue Oct. 30, 1963, Ser. No. 320,242
7 Claims. (Cl. 46—86)

Matter enclosed in heavy brackets [ ] appears in the original patent but forms no part of this reissue specification; matter printed in italics indicates the additions made by reissue.

The present invention relates to toys and more particularly to a time delay action and release means for airborne toys.

The prior art reveals a large number of airborne toys, such as airplanes and the like, but, so far as I know, none of these toys provide a means for retaining certain parts of the airborne toy enclosed or folded in a streamline position while launching and thereafter releasing these parts after the toy has been launched.

It is, therefore, the principal object of the instant invention to provide a time delay release means for airborne toys.

Another object is to provide a time delay release which will hold the flight supporting wings of a toy airplane in rearwardly folded position while launching the airplane and thereafter release the wings to a flight supporting position.

Another object is to provide a release means for component parts of airborne toys which may be repeatedly used without showing any appreciable wear of the release means or of the toy.

Another object is to provide a release means for the wings of a toy aircraft from a rearwardly folded position toward lateral outwardly disposed fuselage flight supporting position wherein such release of the wings further releases objects carried by the airplane such as a parachute, bomb, or the like.

A further object is to provide a time delay release means for airborne toys which may be manually held against release action until the time the toy is actually launched and which will thereafter immediately begin its releasing action.

The present invention accomplishes these and other objects by providing a toy airplane, or the like, having a fuselage supported in flight by a pair of wings pivotally joined in end overlapping relation by a vertical axis carried by the fuselage. Resilient means connected with the forward end of the fuselage and secured at each of its ends to the respective wing, adjacent its pivotal connection, normally urges the wings from a rearward folded overlapping relation toward lateral outwardly disposed flight supporting position. Each of the wings are provided with an outwardly projecting lug on its free tip end. Elongated resilient means is connected at one end to the fuselage and is wrapped around the fuselage and the wing lugs a plurality of times while the wings are in folded position to form an endless frictional contact band.

Other objects will be apparent from the following description when taken in conjunction with the accompanying single sheet of drawings, wherein:

FIGURE 1 is a top plan view of a toy airplane illustrating, in dotted lines, the folded position of the wings;

FIGURE 2 is a side elevational view of FIG. 1 illustrating the wings in folded or airplane launching position;

FIGURE 3 is a fragmentary top plan view illustrating the manner of applying the time delay release means to the wing lugs when the wings are in folded position;

FIGURE 4 is a fragmentary side elevational view of FIG. 3;

FIGURES 5 and 6 are fragmentary side elevational views illustrating alternate arrangements of the resilient release means;

FIGURE 7 is a side elevational view of a toy parachute after release from the airplane;

FIGURE 8 is a fragmentary vertical cross-sectional view illustrating an alternate release means for the wings;

FIGURE 9 is a fragmentary top plan view of the release means illustrated in FIG. 8;

FIGURE 10 is a fragmentary top plan view of the release means shown in FIG. 9, and illustrating an alternate arrangement of the wing tip ends;

FIGURE 11 is a side elevational view of a toy rocket, or the like, wth the release means applied thereto;

FIGURE 12 is a perspective view of the rocket shown in FIG. 11 after the rocket has been released by the release means while in flight; and FIGURE 13 is a fragmentary cross-sectional view illustrating the manner of hinging the rocket halves together.

Like characters of reference designate like parts in those figures of the drawings in which they occur.

In the drawings:

The reference numeral 20 indicates, as a whole, a toy airplane preferably formed of light weight material and comprising a fuselage 22, tail fins or stabilizers 24 and a pair of wings 26. The fuselage 22 is preferably formed from substantially flat material of a selected width and length and includes a tail portion or section 28, a central portion or section 30 and a forward portion 32. The forward portion 32 is of relatively large area for stabilizing the airplane while in flight and includes a rearwardly directed depending shoulder 33 substantially perpendicular with respect to the longitudinal axis of the fuselage for engagement by resilient means 34 attached to a manually held support 36 for launching the toy as hereinafter described. The fuselage forward section 32 is further provided with an upstanding rearwardly facing vertical shoulder 38 of a selected height. The top edge surface 40 of the fuselage rearwardly of the shoulder 38 is preferably straight and lies in a single horizontal plane as viewed in FIG. 2. A recess 42 is formed in the upper surface 40 of the central section 30 of the fuselage for the purposes which will presently be explained.

The fins 24 are preferably formed of relatively thin flat material and are connected to the upper surface of the tail section in upwardly diverging relation.

The wings 26 are formed of similar relatively thin flat material and are each connected at one end in overlapping relation to a pin 44 carried vertically by the fuselage rearwardly of the vertical shoulder 38 and forwardly of the recess 42 for pivotal movement about the vertical axis of the pin. The combined thickness of the wings 26 is substantially equal to the height of the shoulder 38. The overlapping ends of the wings are each arcuately curved outwardly, as at 46, on a radius which permits free rotation of the wings without contacting the vertical face of the shoulder 38. Each arcuate edge 46 of the wings terminates at the forward edge of the respective wing at the base of a shoulder 48 formed on the leading edge of the respective wing, substantially perpendicular with respect to the longitudinal axis of the wing, for the purposes to be presently explained. The outward or free tip of each wing is provided with an outwardly projecting lug 50. The width of each lug 50 is preferably substantially equal with respect to the transverse width of the fuselage portion 28 and longitudinally.

the length of the lugs may be varied as desired, but are preferably formed of a length sufficient to easily receive and retain a time delay release means as hereinafter described in more detail. The length of the wings 26 is preferably such that they will extend from a point adjacent the vertical shoulder 38 to a point just forwardly of the leading edges of the fins 24 when the wings are in the folded position shown by the dotted lines of FIG. 1.

A recess 54 is formed in the forward upper edge of the stabilizing portion 32 of the fuselage to form a forwardly inclined hook-shaped member 56. An elongated resilient member such as a coil spring or rubber band 58 is engaged medially its ends with the member 56 and is extended rearwardly and outwardly under tension and is connected at its respective ends to the upper surface of the top most wing and to the lowermost surface of the lower wing, respectively, at a position adjacent but spaced outwardly of the vertical axis 44. Thus the member 58 urges the wings toward the forward flight sustaining position illustrated in FIG. 1. This forward movement of the wings is limited by the respective shoulder 48 on the leading edge of the wings contacting opposing sides of the fuselage adjacent the vertical shoulder 38.

Time delay resilient release means 60 comprising a length of elastic material or strand of rubber such as a section of a rubber band 62 is connected at one end to the fuselage section 28 adjacent the rearward limit of the wings when in folded position and is manually deformed or stretched uder a desired amount of tension and then wound around the fuselage section 28 and the overlapping lugs 50 a plurality of times. Since the band 62 is under tension when wound around the device and the wraps or turns of the band are not uniformly spaced or placed side by side but are wound in indiscriminate fashion thus overlapping each other and tending to tangle one inner wrap over an adjacent outer wrap, the band will, when released, tend to return toward its original undeformed state. This action is retarded or delayed by such overlapping or tangled state of the strands depending, of course, on the number of wraps of the band 62 and the amount of intermingling of the strands. Thus the wings 26 are released from a folded launching position to oppositely outward direction position for flight.

An alternate way of connecting a resilient member 65, such as a rubber band, to the device 20 is shown by FIG. 5. In this instance, a notch 66 is cut into the arcuate edge of the fuselage defining the recess 42 to form a hook-shaped prong 67. The band 65 is engaged with this hook 67 and extended rearwardly, under tension, along one side of the fuselage then upwardly and across the wing lugs 50 and then downward and forward along the opposing side of the fuselage where the free loop end of the band 65 is engaged with the forward lower surface edge 68 of an arcuate edged depending projection 69 formed on the lowermost edge of the fuselage forwardly of the rear end position of the wings. It is to be noted that the edge 68 slopes rearwardly in a manner which will not retain the looped band therearound but permits the band 65 to crawl or creep toward the lowermost limit of the projection 69 thus releasing the wings 26 for flight of the device after launching.

FIG. 6 illustrates a further modification of the time delay release means wherein a single strand or length of elastic or rubber band 70 has one end portion inserted into the notch 66 and is retained therein against tension applied to the free end of the strand by a simple knot 72 tied in the end of the strand. The strand is wrapped over the wing lugs 50 in a manner similar to the manner of applying the band illustrated in FIG. 5 but in this instance the free end portion of the strand is engaged by the walls of a relatively narrow downward and forwardly open slot 74 formed in the lowermost edge of the fuselage forwardly of the position of the rearward ends of the wings when in folded position. The strand being under tension will gradually overcome the frictional resistance offered by the walls forming the slot 74 thus releasing the strand 70 and the wings.

Still another manner of effecting a time delay release means is illustrated in FIGS. 8 and 9 wherein a resilient member, such as a length of spring steel 75, or the like, is connected at one end by a rivet 76 extended vertically through the member 75 and the fuselage forwardly of the stabilizing fins 24. A hole 78 is drilled through both wing lugs 50 and into the adjacent upper edge of the fuselage while the wings are in folded position. A pin 79 is secured to the free end of the member 75 in depending relation and is adapted to be frictionally received by the walls forming the hole 78. The spring member 75 is manually deflected downwardly for engaging the pin within the hole 78 through the wing lugs 50 and since the spring member 75 has a tendency to return to the position shown by dotted lines in FIG. 8 the wings will be released when the pin clears the uppermost surfaces of the wing lugs 50. Obviously the pin 79 may be coated or covered with rubber or the like for increasing the coefficient of friction between the pin 79 and the walls forming the hole 78. This spring member 75 and pin 79 may be used to release the wings from a folded position by forming a shoulder 50A on the free tip end of each wing thus forming a rearwardly open V-shaped notch 80 when the wings are in folded position wherein the respective shoulder 50A is disposed on opposing sides of the pin 79 and opposite to the direction the resilient member 58 tends to urge the respective wing for flight position.

With the wings 26 in folded position a toy parachute 82 is folded and placed within the recess 42 of the fuselage and the resilient release means 60 is engaged with the fuselage and wing lugs 50 as described hereinabove. The device 20 is then manually launched or shot upward into the atmosphere by means of the support 36 and resilient means or member 34 by manually holding the rearward end portion 28 of the fuselage while placing the member 34 under tension. The free end portion of the resilient release means 60 is manually grasped between the finger or thumb 84 and the fuselage 28 (FIG. 4) by the operator to prevent the start of the release action prior to the launching of the device. After the airplane 20 has been projected upwardly into the atmosphere the release means 60 permits the member 58 to pivot the wings 26 to a flight sustaining position as illustrated by solid lines in FIG. 1. Removal of the wing from contact with the parachute 82 permits the latter to fall by gravity out of the recess 42 and begin its gradual descent thus simulating, in the mind of the operator, a parachute jump (FIG. 7). Obviously other articles may be carried by the fuselage recess, such as toy bombs or the like, not shown, for simulating a mock war or bomb attack by aircraft.

Referring more particularly to FIGS. 11 to 13 the numeral 90 indicates, as a whole, a toy airship or rocket comprising a hollow streamlined body longitudinally divided to form two halves 92 and 94. The two halves or sections are hingedly connected at the leading end 96 of the rocket to permit separation of the two halves after launching the rocket. The tail end portion, of each of the two sections 92 and 94, are provided with flight stabilizing fins 97 and 98. A launching hook or projection 99 protrudes laterally outward of the forward surface of the rocket half 92 for launching the rocket in a manner similar to that of launching the airplane 20.

Time delay resilient means 60A, similar to the means 60, is connected at one end to the rocket fin 97 and wound a plurality of times around the tail end portions of the rocket halves which project rearwardly beyond the fins. The free end of the release means 60A is frictionally received by a slot 105 formed in the fin 98 adjacent the surface of the rocket for retarding the release action of the means 60A in a manner similar to that disclosed for the means 60. Obviously the free end of the means 60A must be manually grasped between a thumb or finger and the fin 98, by the operator, while launching the rocket to prevent the start of the releasing action until after the rocket is airborne. The rocket 90 is preferably divided intermediate its ends by partitions 106 to form a forward and a rearward compartment, 100 and 101, respectively, into which may be placed parachutes, toy bombs or the like, not shown. In the example shown by FIG. 12, a toy parachute has been placed within the forward compartment 100 and is connected by its shroud lines 102 to a ring 103 connected with the surface of the rocket. The purpose of connecting a parachute to the rocket 90 in this manner is to permit lowering the latter through the atmosphere and preclude damage thereto by a free fall after discharging cargo or articles carried by the compartment 101. A spring *107* [106], carried by the hinge pin 104 and having its end portions contacting the inner surface of the head end of the rocket, acts to open the latter when airborne after the time delay release means has released the tail end portions of the rocket.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A toy rocket, comprising: an elongated stream-lined hollow body having a head and a tail end, said body being longitudinally divided; spring actuated hinge means hingedly connecting said body halves together at their head ends and biasing said ends to open position; a stabilizing fin connected with each section of said body adjacent the tail end thereof, at least one of said body fins having a recess adjacent the surface of said body for forming a forwardly open slot; and flexible time delay release means comprising an elongated resilient member connected at one end with one of said fins and frictionally wrapped under tension around the tail end portions of said body halves and the other end portion disposed within the forwardly open slot in such manner as to be released therefrom in the flight of the rocket.

2. A toy rocket, including: an elongated stream-lined hollow body having a head and a tail end, said body being longitudinally divided; a transverse partition dividing said body into two cargo receiving sections; spring actuated hinge means hingedly connecting said body halves together at their head ends and biasing said ends to open position; a stabilizing fin connected with each section of said body adjacent its tail end, at least one said fin having a forwardly open transverse slot formed therein; and resilient time delay release means comprising an elongated resilient member connected at one end with one of said fins and frictionally wrapped under tension around the tail end surfaces of said body halves and the other end portion disposed within the forwardly open slot in such manner as to be released therefrom in the flight of the rocket.

*3. A toy rocket, comprising: a hollow body having a head and a tail end, said body being divided; hinge means hingedly connecting said body halves together at their head ends and biasing the tail ends to open position; a stabilizing fin connected with one section of said body adjacent the tail end thereof, said body fin having a recess adjacent the surface of said body for forming a forwardly open slot; and flexible time delay release means comprising an elongated member connected at one end with one of said body halves and wrapped around the tail end portions of said body halves and the other end portion of said time delay release means disposed within the forwardly open slot in such manner as to be released therefrom in the flight of the rocket.*

*4. A toy rocket, including: a hollow body having a head and a tail end, said body being longitudinally divided; a transverse partition dividing said body into at least two cargo receiving sections; hinge means hingedly connecting said body halves together at their head ends and biasing said tail ends to open position; a stabilizing fin connected with at least one section of said body adjacent its tail end, said fin having a forwardly open transverse slot formed therein; and time delay means comprising an elongated member connected at one end with said fin and wrapped under tension around the tail end surfaces of said body halves and the other end portion of said time delay means disposed within the forwardly open slot in such manner as to be released therefrom in the flight of the rocket.*

*5. A toy rocket, including: a hollow body having a head end and a tail end, said body being divided; a transverse partition within said body forming at least two cargo receiving sections; hinge means connecting said body halves together at one end and biasing the opposite ends to open position; a stabilizing fin connected with at least one section of said body adjacent its tail end, said fin having a forwardly open transverse slot; and flexible time delay means comprising an elongated strand connected at one end to one said body half, said strand wrapped across the line of juncture of said body halves with a portion of the other end portion of said strand disposed within the forwardly open slot of said fin in such a manner as to be released therefrom in the flight of the rocket.*

*6. A toy rocket, including: an elongated stream-lined hollow body having a head end and a tail end, said body being longitudinally divided; hinge means connecting said body halves together at their head ends and biasing said tail ends to open position; a stabilizing fin connected with at least one section of said body, said fin having a forwardly open transverse slot; and flexible time delay release means comprising an elongated strand connected to one said body half, said strand wrapped across the line of juncture of said body halves with a portion of said strand disposed within the forwardly open slot of said fin in such a manner as to be released therefrom in the flight of the rocket.*

*7. A toy rocket, including: an elongated stream-lined hollow body having a head end and a tail end, said body being longitudinally divided; hinge means connecting said body halves together at their head ends and biasing said tail ends to open position; a stabilizing fin connected with at least one section of said body, said fin forming a forwardly open slot adjacent the surface of said body; and flexible time delay release means comprising an elongated strand connected to one said body half, said strand wrapped across the line of juncture of said body halves with a portion of said strand disposed within the forwardly open slot of said fin in such a manner as to be released therefrom in the flight of the rocket.*

References Cited by the Examiner

The following references, cited by the Examiner, are of record in the patented file of this patent or the original patent.

UNITED STATES PATENTS

| | | | |
|---|---|---|---|
| 1,599,280 | 9/26 | Lewis | 46—80 |
| 1,649,374 | 11/27 | Zundel et al. | 46—86 |
| 2,136,067 | 11/38 | Witte. | |
| 2,306,866 | 12/42 | Crary | 46—80 |
| 2,380,223 | 7/45 | Dodds | 46—86 |
| 2,538,522 | 1/51 | Jackle. | |
| 2,587,699 | 3/52 | Cotter. | |
| 2,756,538 | 7/56 | Corbett. | |

FOREIGN PATENTS

| | | |
|---|---|---|
| 1,012,170 | 4/52 | France. |

RICHARD C. PINKHAM, *Primary Examiner.*